United States Patent Office 3,541,386
Patented Nov. 17, 1970

3,541,386
CONTROL SYSTEM FOR TERMINATING THE DISCHARGE OF A FLASH LAMP
Karl Ackermann, Berlin, Germany, assignor to Robert Bosch Elektronik Gesellschaft mit beschraenkter Haftung, Berlin, Germany
Filed Jan. 27, 1969, Ser. No. 794,253
Claims priority, application Germany, Apr. 3, 1968, 1,772,129
Int. Cl. G01j 1/32; H01j 39/12; H05b 41/38
U.S. Cl. 315—151                                    10 Claims

ABSTRACT OF THE DISCLOSURE

An electronic flash arrangement for photographic cameras in which a light measuring device is operated through a D.C. operating voltage. A control circuit includes a photosensitive element upon which impinges light reflected from the object to be photographed. After ignition of the flash bulb, the control circuitry extinguishes the flash bulb when a predetermined amount of light has impinged upon the photosensitive element. The arrangement is such that the D.C. operating voltage for the light measuring device does not appear until discharge of the flash bulb has been commenced.

BACKGROUND OF THE INVENTION

The present invention resides in electronic flash apparatus adapted for photographic applications. The apparatus includes electronic control circuitry provided with a photoelectric light measuring device fed with a D.C. operating voltage. The electronic control circuitry provides that the flash bulb be extinguished as soon as the object or scene to be photographed through illumination from the flash bulb, has reflected a predetermined quantity of light onto the light sensitive element of the light measuring instrument.

Electronic flash apparatus with control arrangements have been made commercially available for the purpose of saving the photographer the task of setting the diaphragm of the photographic camera prior to each exposure due to different distances between the flash apparatus and the object or scene to be photographed. In such commercially available apparatus, the flash bulb becomes automatically extinguished when the scene or object to be photographed is sufficiently illuminated. The control arrangement adjusts a duration of the flash in accordance with the quantity of light reflected by the object or scene to be photographed and impinging upon the light sensitive element in the apparatus. Through this arrangement, the object or scene to be photographed is properly illuminated.

The light measuring instrument or device includes, for this purpose, an integrating arrangement which integrates the electrical current resulting from the transformation of light into corresponding electrical current through the light sensitive element. This integrating arrangement actuates the control circuitry as soon as the integrated current attains a predetermined value. The conventional medium used for integration purposes is a capacitor which integrates the current derived from a light sensitive element. The capacitor becomes charged and when a predetermined voltage level is attained across the capacitor, the control circuitry is actuated and the flash bulb becomes extinguished.

For purposes of extinguishing the flash bulb, it is known in the art to use a discharge tube in parallel with the flash bulb. When ignited, the discharge tube has a considerably lower internal resistance than the flash bulb. The discharge tube becomes ignited through the control circuitry when the predetermined voltage level across the capacitor has been attained. As a result of the lower internal resistance of the ignited discharge tube, the storage capacitor providing the flash bulb with electrical energy, becomes discharged, and the flash bulb becomes thereby extinguished.

Electronic flash apparatus which such control circuitry or control arrangement has, however, the disadvantage that interference can be had from the prevailing ambient light within the exposure area and from neighboring photographers using flash apparatus. As a result of the ambient light, the capacitor integrates current from the light sensitive element prior to flashing of the apparatus. The capacitor thereby possesses an unpredictable voltage before initiating the flash, and therefore the time interval during which the predetermined voltage level is attained, is no longer well defined. A remote flash from another apparatus in the vicinity, can actuate the control arrangement of the flash apparatus at an undesired instant of time, and thereby discharge the storage capacitor.

In order to prevent interference from the ambient light, it has been proposed to use a photoresistor of predetermined characteristics as the one and only integrating element, and to omit thereby the integrating capacitor. With such a control arrangement, however, interferences from other flashes cannot be prevented.

It is also known to switch on the light measuring device first at the beginning of the flash through a switch or shutter mechanism. With such an arrangement it is possible to avoid interferences from other flashes as well as the ambient light. These arrangements, however, require mechanisms which must be carefully constructed, are complex in design and are thereby costly to produce. Furthermore, such mechanisms do not operate reliably.

The present invention demonstrates the manner in which the effects of ambient light as well as remote flashes can be avoided through very simple and reliable means. The present invention resides in the provision that the operating D.C. voltage for the light measuring device results first from the effect of the discharge of the flash bulb. Through this arrangement which uses only electrical parts and no mechanical components, the control arrangement is switched on only during the flash of its own apparatus. As a result, interferences from other flashes and the ambient light cannot take place.

Different possibilities are available for synthesizing a concept of the present invention. Thus, the operating D.C. voltage for the light measuring device can be derived from the voltage of capacitor which becomes charged through the voltage drop across a resistor within the circuit of the flash bulb. The charging process also takes place through a diode or rectifier which prevents the discharging of the capacitor.

When igniting the flash bulb and upon discharge of the electrical energy from the storage capacitor for the flash bulb, a very small voltage rise appears across the preceding resistor. This voltage rise then transfers to a continuously dropping voltage during the flash interval. This pulse voltage, however, is not adapted as the operating voltage for the light measuring device, since the operating voltage for the light measuring device must remain substantially constant during the flash interval. This requirement is imposed in order to achieve integration which is free from error. As a result of this condition, the capacitor is connected in parallel with the resistor through a diode or rectifier. The capacitor becomes charged very rapidly, upon ignition of the flash bulb, to approximately the peak voltage across the resistor. The diode or rectifier prevents, on the other hand, the discharge of the capacitor when the voltage across the resistor drops. The voltage across the capacitor remains thereby substantially constant during the flash interval, and is adapted for the operating D.C. voltage for the light measuring device.

Another possibility exists for permitting the operating D.C. voltage to appear first after the discharge of the flash bulb. In such an arrangement, in accordance with the present invention, the voltage across a capacitor serves as the operating D.C. voltage for the light measuring device. The capacitor becomes charged through a photosensitive element located within the light region of the flash bulb, and through a diode or rectifier which prevents the discharge of the capacitor.

The preceding photosensitive element can, for example, be secured on the interior side of the reflecting wall of the flash bulb. The capacitor which becomes charged through this photosensitive element also becomes very rapidly charged as a result of the steeply rising light energy. With the charging of the capacitor, the operating D.C. voltage is formed.

In carrying out the concept of the present invention, the light measuring device can include a series circuit lying at the operating D.C. voltage and consisting of a light sensitive element in the form of a photoresistor, an adjustable charging resistor, and an integrating capacitor.

The adjustable charging resistor must be set in accordance with the sensitivity or film speed of the film being used. This setting is the only setting which remains to be applied by the photographer. This setting remains the same for as long as a same film material is used. After ignition of the flash bulb, an electrical current is produced through the photoresistor. This current is dependent upon the brightness or light intensity and the distance between the flash bulb and the object to be illuminated. The current is integrated in the capacitor which attains a predetermined voltage after a given time interval suitable for illuminating the film.

In accordance with a further embodiment of the present invention, the voltage of the integrating capacitor can prevail at the cathode-control electrode path of a controlled silicon rectifier or thyristor, by way of a protective resistor. This controlled silicon rectifier or thyristor ignites, in the conventional manner, a discharge tube connected in parallel with a flash bulb, when the thyristor conducts or has been fired. The discharge tube, when ignited, has a considerably lower internal resistance than the flash bulb.

Through the large current of the ignited discharge tube under the action of the thyristor, the storage capacitor for the flash bulb becomes discharged earlier than it would through the flash bulb itself. As a result, the flash bulb becomes extinguished at the correct instant of time for the illumination of the film held in the camera.

Another feature of the present invention resides in the interconnection of the thyristor and the discharge tube.

SUMMARY OF THE INVENTION

An electronic flash arrangement adapted to photographic applications in which the object or scene to be photographed is illuminated by a flash bulb. A light meter having a light sensitive element in the form of a photoresistor, for example, lies in the path of light reflected by the object from the flash bulb. A control circuit including an arrangement for applying a D.C. operating voltage to the light meter extinguishes the flash bulb when the light reflected by the object and impinging upon the light-sensitive element has attained a predetermined quantity. The operation is such that the D.C. operating voltage appears first after the flash bulb has become ignited. A capacitor serves as a source of the D.C. operating voltage for the light meter or light measuring device. The capacitor becomes charged through the voltage drop of a resistor in the circuit of the flash bulb, and by way of a diode or rectifier which prevents the discharge of the capacitor.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
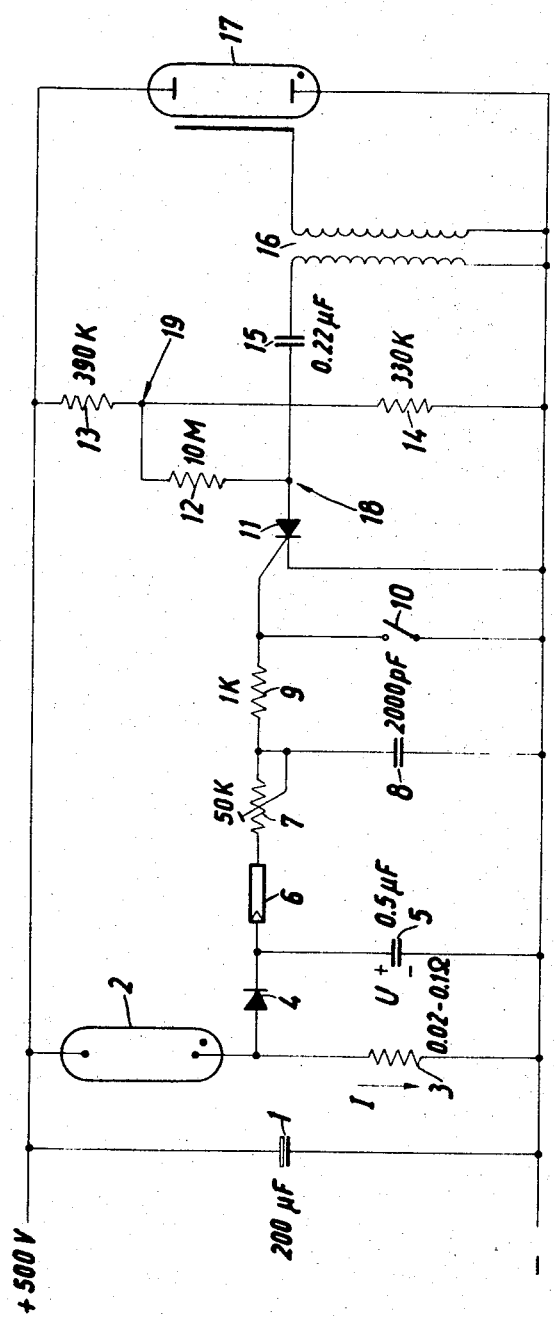
FIG. 1 is an electronic schematic diagram of a control arrangement with a flash bulb in photographic cameras and a discharge tube for extinguishing the flash bulb, in accordance with the present invention.

Referring to the drawing, a storage capacitor 1 of approximately 200 μf. becomes charged to approximately 500 volts through components not shown, a few seconds after the electronic flash apparatus is actuated or switched on. The storage capacitor 1 provides the electrical energy for the flash bulb 2. When this flash bulb becomes ignited through a release mechanism, not shown, current I flows through the resistor 3 having a resistance value within the range of 0.02 to 0.1 ohm. As a result of this current flow, a voltage drop appears across the resistor serving to charge a charging capacitor 5 by way of a diode or rectifier 4.

Figure 2:
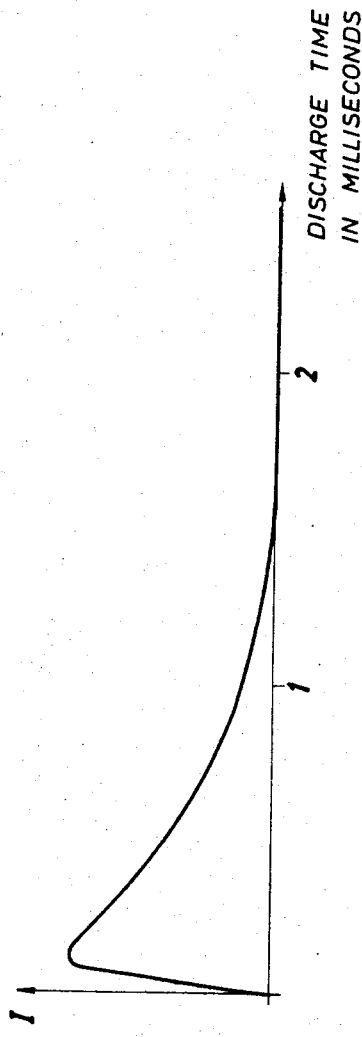
FIG. 2 is a graphical representation of the current in a flash bulb as a function of time.

FIG. 2 shows a graphical representation of the magnitude of the current I through the resistor 3, as a function of time in milliseconds. This graphical plot shows that the discharged time of the flash bulb 2 consumes approximately one and a half milliseconds, and that the current rises steeply at the beginning of the discharge and then drops off. In accordance with FIG. 3 correspondingly, the voltage U across the charging capacitor 5 attains its maximum value very shortly after the flash is initiated, and then remains substantially at this level. The diode or rectifier 4 prevents discharge of the capacitor when the voltage across the resistor 3 drops.

Figure 3:
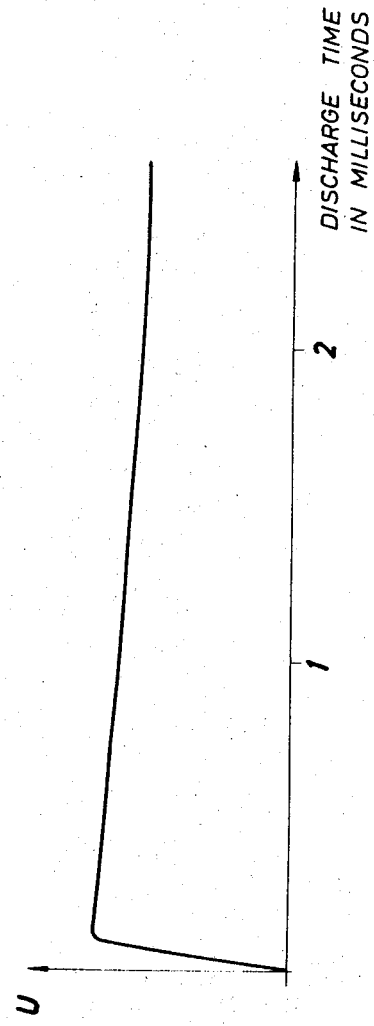
FIG. 3 is a graphical plot of the voltage across the capacitor providing a D.C. operating voltage, as a function of time, in accordance with the present invention.

The voltage U which remains at approximately the same level or value long after the discharged time of the flash bulb 2, as shown in FIG. 3, forms the operating D.C. voltage for a series circuit including a photoresistor 6, and an adjustable resistor 7, and an integrating capacitor 8. The photoresistor serves as a light-sensitive element which varies its resistance value as a function of the illumination intensity so that a current of larger magnitude flows from the capacitor 5 to the capacitor 8 for greater intensity of illumination. The capacitor 8 integrates the individual current elements, and as a result the voltage across the capacitor 8 rises continuously. For higher intensities of illumination applied to the photoresistor 6, the capacitor 8 attains more rapidly a predetermined voltage level, than for lower intensities of illumination. The adjustable resistor 7 must, as already mentioned, be set in accordance with the sensitivity or film speed of the film material being used. This setting of the adjustable resistor may be a one-time setting.

A controlable silicon diode 11 in the form of a thyristor receives its anode potential by way of a large resistor 12 of the order of approximately 10 megohms. The resistor 12 is connected between the anode terminal 18 and the tap or junction 19 of a voltage divider consisting of resistors 13 and 14. This voltage divider is connected across the 500 volt supply of the flash bulb 2. The control or firing electrode of the thyristor is connected, by way of a protective resistor 9, to the integrating capacitor 8. The cathode of the thyristor is connected, on the other hand, to ground potential. The anode-cathode path of the thyristor does not conduct when the voltage prevailing between the cathode and the firing electrode is below a predetermined value. As long as the thyristor does not conduct, the ignition capacitor 15 remains charged. One terminal of the capacitor 15 is connected to the junction 18 which joins the anode of the thyristor 11 and the resistor 12. Thus, this terminal of the capacitor 15 leads to the tap or junction 19, through the resistor 12. The other terminal of ignition capacitor 5 has ground potential applied to it through the primary winding of an ignition transformer 16.

Upon ignition of the flash bulb 2 for the purpose of illuminating the object or scene to be photographed, the voltage across the charging capacitor 5 is rapidly made available as the D.C. operating voltage. At the same time, integrating capacitor 8 becomes charged to a potential at which the thyristor 11 becomes fired or conducts. The integrating capacitor 8 becomes thus charged through current flow from the charging capacitor 5 through the photoresistor 6. As a result, the ignition capacitor 15 charges through the anode-cathode path of the thyristor which has become conducting, and a current pulse arises thereby within the primary winding of the ignition transformer 16. This current pulse in the primary winding gives rise to a pulse within the secondary winding of the ignition transformer 16, for igniting the discharged tube 17.

When in the ignited state, this discharge tube 17 has a considerably lower resistance value than the flash bulb 2. Accordingly, the latter becomes extinguished when the discharged tube is ignited, so that the object or scene to be photographed becomes no longer illuminated. The discharge tube 17 is arranged within the interior of the electronic flash apparatus and is covered against the external environment.

Upon extinguishing the flash bulb 2 through means of the discharge tube 17, a small residual voltage remains across the storage capacitor 1. As a result, a small residual voltage also prevails at the tap or junction 19 of the voltage divider consisting of resistors 13 and 14. In order that the junction terminal 18 acquire a small voltage so that the thyristor becomes again turned off or nonconducting, a very high resistance value is selected for the resistor 12. Thus, this resistor is specified to be of the order of 10 megohms. The integrating capacitor 8 discharges after the thyristor 11 has been fired or steered to its conducting state. The integrating capacitor 8 discharges to ground potential, in this manner, through the protective resistor 9 and the control electrode-cathode path of the thyristor 11.

By closing a switch 10, it is possible to render inoperative the electronic control arrangement for the automatic extinguishing of the flash bulb 2.

The numerical component values illustrated in the drawing are shown only for purposes demonstrating the basis for their selection. Depending upon the circumstances, other component values may be equally well adapted.

It will be understood that each of the elements described above, or two or more together, may also find a useful application in other types of construction differing from the types described above.

While the invention has been illustrated and described as embodied in electronic flash apparatus for photography, it is not intended to be limited to the details shown, since various modifications and structural changes may be made without departing in any way from the spirit of the present invention.

What is claimed as new and desired to be protected by Letters Patent is set forth in the appended claims.

I claim:

1. A photographic electronic flash arrangement comprising, in combination, flash bulb means for illuminating the object to be photographed; light measuring means; operating means for applying a D.C. operating voltage to said light measuring means; and control means connected to said light measuring means and said operating means for extinguishing said flash bulb means after ignition when light reflected by said object and impinging upon said light measuring means is of a predetermined quantity, the discharge current flowing through said flash bulb means being the source of said D.C. operating voltage so that said D.C. operating voltage prevails only upon discharge of said flash bulb means.

2. The photographic electronic flash arrangement as defined in claim 1 including capacitor means in said operating means; resistor means connected in series with said flash bulb means; and rectifier means connected to said capacitor means, said capacitor means being charged from the voltage drop on said resistor means and through said rectifier means.

3. The photographic electronic flash arrangement as defined in claim 2 wherein said resistor means has a value less than one ohm.

4. The photographic electronic flash arrangement as defined in claim 2 wherein said resistor means has a resistance value within the range between 0.02 and 0.1 ohm.

5. The photographic electronic flash arrangement as defined in claim 1 including capacitor means in said operating means for providing said D.C. operating votlage; photosensitive means arranged within the light region of the flash bulb and charging said capacitor means; and rectifier means connected in series with said capacitor means for preventing the discharge of said capacitor means.

6. The photographic electronic flash arrangement as defined in claim 1 including a series circuit in said light measuring means and comprising a light sensitive element, adjustable resistor means, and integrating capacitor means.

7. The photographic electronic flash arrangement as defined in claim 6 including protective resistor means connected to said integrating capacitor means; control silicon means so that the voltage of said integrating capacitor means appears across the cathode-control electrode path of said control rectifying means; discharge tube means connected in parallel with said flash bulb means and ignited by said control rectifying means, said discharge tube means having a substantially lower internal resistance when ignited than said flash bulb means.

8. The photographic electronic flash arrangement as defined in claim 7 including ignition transformer means for igniting said discharge tube means said ignition transformer means having primary and secondary windings; ignition capacitor means connected between said primary winding of said ignition transformer means and the anode of said control silicon rectifying means; a source of predetermined voltage potential; and resistor means connected between said source of voltage potential and the junction of said ignition capacitor means and said anode of said control silicon rectifying means.

9. The photographic electronic flash arrangement as defined in claim 8 wherein said resistor means is connected between said source of voltage potential and said anode of said control silicon rectifying means has a substantially large resistance value.

10. The photographic electronic flash arrangement as defined in claim 9 wherein said source of voltage potential is a voltage divider comprised of two resistors connected in series, the voltage appearing at the junction of the two series connected resistors of said voltage divider being applied to the anode of said control silicon rectifying means through said resistor means of substantially large resistance value.

References Cited

UNITED STATES PATENTS

| | | | |
|---|---|---|---|
| 3,033,988 | 5/1962 | Edgerton | 315—151 X |
| 3,340,426 | 9/1967 | Elliott | 315—151 |
| 3,350,603 | 10/1967 | Erickson | 315—151 |
| 3,350,604 | 10/1967 | Erickson | 315—151 |

JAMES W. LAWRENCE, Primary Examiner

C. R. CAMPBELL, Assistant Examiner

U.S. Cl. X.R.

250—205, 206; 315—156, 159